United States Patent [19]

Lashley

[11] 3,811,616

[45] May 21, 1974

[54] HIGH SPEED TRAIN TRACK
[76] Inventor: Raymond Lashley, Syracuse, Utah
[22] Filed: Mar. 22, 1973
[21] Appl. No.: 343,830

Related U.S. Application Data
[62] Division of Ser. No. 65,630, Aug. 20, 1970, Pat. No. 3,728,974.

[52] U.S. Cl. .......... 238/150, 191/29 DM, 238/122, 238/151
[51] Int. Cl.............................................. E01b 5/08
[58] Field of Search ...... 75/122; 238/150, 151, 134, 238/122, 148, 167, 171, 173; 191/22 DM, 29 DM

[56] References Cited
UNITED STATES PATENTS
| | | | |
|---|---|---|---|
| 3,616,763 | 11/1971 | Colling et al. | 238/150 |
| 3,528,608 | 9/1970 | Dashew et al. | 138/151 |
| 2,242,329 | 5/1941 | Savlson | 238/134 |
| 2,444,954 | 7/1948 | Rajemaker | 238/151 |

Primary Examiner—M. Henson Wood, Jr.
Assistant Examiner—Richard A. Bertsch
Attorney, Agent, or Firm—B. Deon Criddle

[57] ABSTRACT

A composite laminated construction track for use in a relatively low cost and economically operated high speed passenger transportation system wherein motive vehicles are coupled to provide transportation for large numbers of people. A powered main vehicle that may be one unit or more than one coupled unit is provided to travel between terminal stations and detachable passenger ferrying auxiliary vehicles are used to transport passengers and their baggage between the main vehicle and intermediate loading or unloading stations. Operation of the independently powered motive vehicles is coordinated through a computer system, sensing units on the vehicles provide signals for coupling control and specially constructed tracks and track switching insure safe operation even at very high speeds.

4 Claims, 11 Drawing Figures

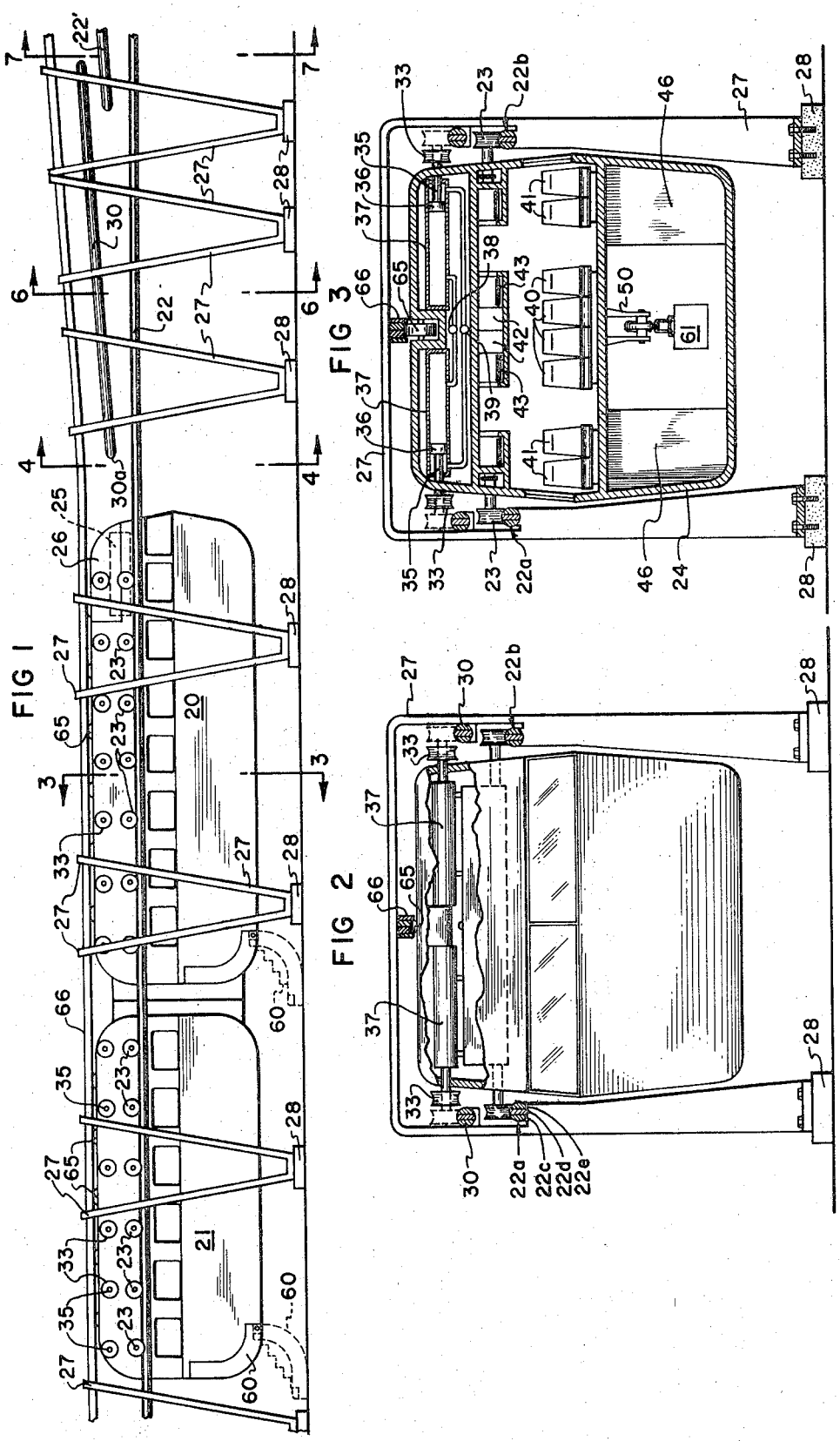

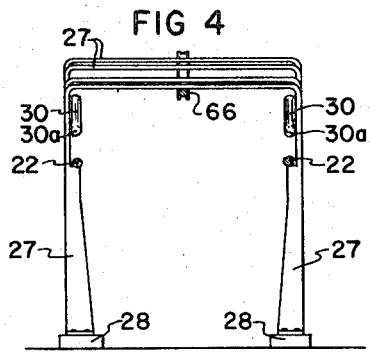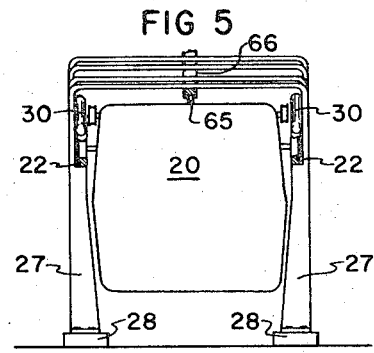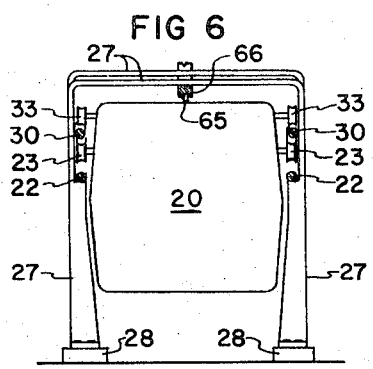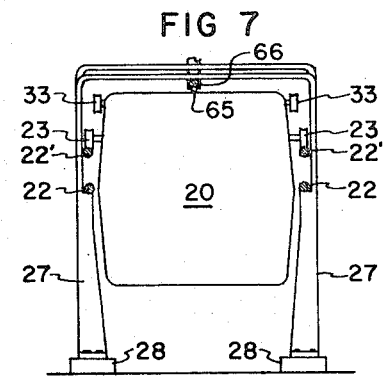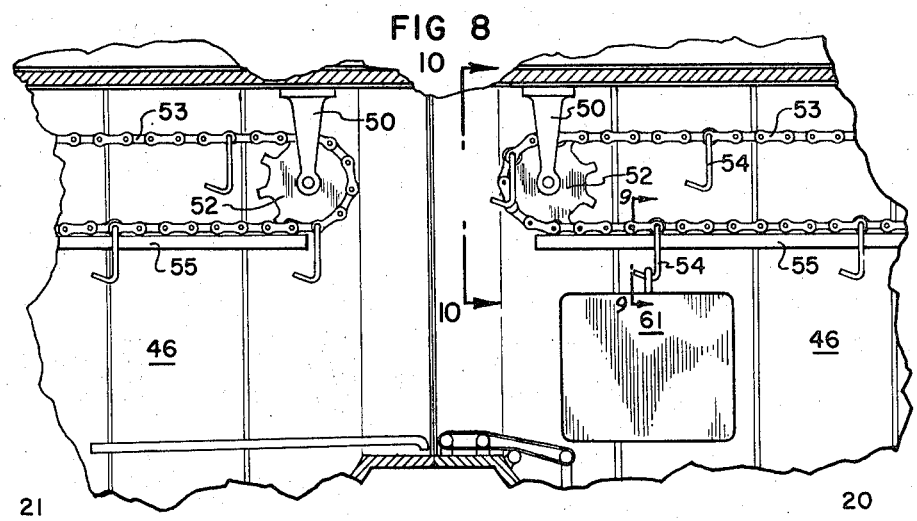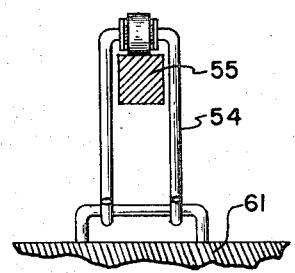

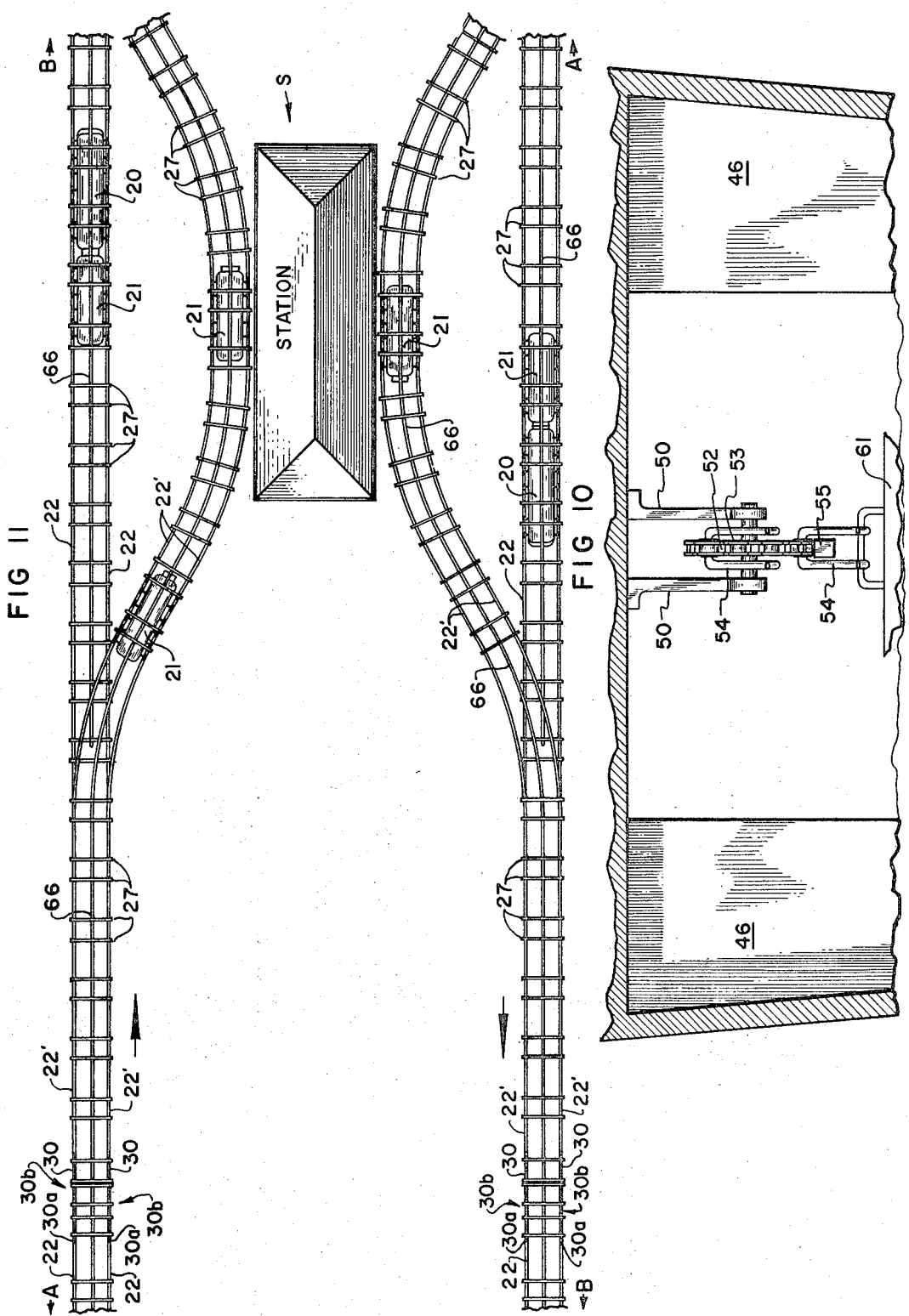

HIGH SPEED TRAIN TRACK

This application is a division of application Ser. No. 065,630, filed Aug. 20, 1970 now U.S. Pat. No. 3,728,974.

BRIEF DESCRIPTION

1. Field of the Invention

This invention relates to tracks suitable for use with high speed, vehicle systems for transporting masses of people between terminal stations and for picking up and discharging passengers at intermediate stations located between the terminal stations.

2. Prior Art

Railway travel has for many years been on heavy, bulky trains made up of huge engines and coupled cars running on ground level tracks. These have been slow and entirely unsuitable for passenger travel in the present day and age. Various proposals for providing faster trains have been made and the need for rapid mass transit, over the ground, is well recognized. However, I am not aware of any proposed system incorporating the advantageous features of my invention, whereby very rapid mass transit is obtained at relatively low cost and with maximum passenger comfort.

SUMMARY OF THE INVENTION

The principal object of this invention is to provide a safe, high speed, tracked vehicle system for transporting masses of people at very high speeds, i.e. 300 miles per hour or more.

Other objects are to provide a relatively low cost, but safe, high speed rail system utilizing a main vehicle traveling between terminal stations and with auxiliary shuttle vehicles moving passengers to and from intermediate stations and the main vehicle.

It is a further object of this invention to provide an auxiliary shuttle vehicle designed to overtake and dock with the main vehicle while it is traveling on rails at its normal speed and to provide a unique rail switching system whereby the shuttle vehicles can be translated from one set of principal main rail tracks to transfer tracks and then to another set of main rail tracks safely, without a significant reduction in speed and without mechanical switching mechanisms for the tracks.

It is still another object of this invention to provide a main rail vehicle designed to comfortably accommodate passengers and to provide for efficient and simple handling of passenger baggage and conveniences.

SUMMARY OF THE INVENTION

Principal features of the invention include a main passenger and baggage carrying rail vehicle, independently powered auxiliary shuttle vehicles adapted to couple to one another and to the main vehicle, a relatively low cost rail system embodying a reliable and relatively inexpensive switching system and an efficient loading and discharge system for passengers and baggage. The vehicles each include a compartmentized, conveyor system for stored baggage handling and conveyor means for moving the storage for carry on baggage and conveyors for distribution of in travel meals are provided as features of the main vehicle.

Other objects and features of the invention will become apparent from the following drawings, detailed description and claims.

THE DRAWINGS

In the drawings:

FIG. 1 is a side elevation of a main vehicle and a shuttle vehicle of the invention in coupled relationship and on tracks of the invention and with the switch section of the track shown fragmentarily in side elevation;

FIG. 2, a front elevation view;

FIG. 3, a vertical section, taken on the line 3—3 of FIG. 1;

FIG. 4, a vertical section taken on the line 4—4 of FIG. 1 and drawn to a smaller scale;

FIG. 5, a view like FIG. 4, but with a shuttle vehicle shown in outline form on the principal main tracks of the switch section and with the switch wheels of the shuttle vehicle retracted;

FIG. 6, a view like FIG. 5, but with the switch wheels extended and riding on transfer rails;

FIG. 7, a view like FIG. 6, but showing the main wheels of the shuttle vehicle traveling on the shuttle tracks and with the switch section of the track shown as a vertical section, taken on the line 7—7 of FIG. 1;

FIG. 8, an enlarged fragmentary schematic view of the baggage compartments of coupled main and shuttle vehicles and showing the baggage handling conveyors therein;

FIG. 9, a vertical section through the baggage compartment, taken on the line 9-9 of FIG. 8;

FIG. 10, an even larger view taken on the line 10—10 of FIG. 8; and

FIG. 11, a schematic diagram of a typical boarding station area, including principal main tracks, transfer tracks and other main tracks, and main and shuttle vehicles.

DETAILED DESCRIPTION

Referring now to the drawings:

As best seen in FIG. 1, the train of the invention includes a main vehicle 20 and one or more auxiliary or shuttle vehicles 21, only one of which is shown coupled behind the main vehicle 20. The train rides upon an elevated trackway 22 made up of spaced rails 22a and 22b. The vehicles are suspended between the rails 22a and 22b by sets of wheels 23 that are journaled on drive shafts extending outboard of the vehicles. The wheels 23 are journaled above the centers of gravity of the vehicles so that the bulk of the weight of each vehicle is below the rails, thereby increasing train stability, even at speeds in excess of 300 miles per hour. The stability is further increased by the streamlined aero-dynamic design of the vehicles themselves. The vehicles are of standard aircraft-type construction and include a strong lightweight skin 24 stretched over a supporting frame. An engine 25 and drive connections therefor to the wheels 23, including transmissions, are provided in a compartment 26 above the passenger compartment. The engine and transmissions are conventional and therefore are not described in detail herein.

Rails 22a and 22b are wider apart than the gauge of conventional railroads and are supported by arches 27. The ends of the arches are bolted to concrete piers or footings 28. As best seen in FIGS. 2 and 3, to minimize the problem of thermal expansion, the rails are each constructed of laminations 22c, 22d and 22e of thermally compensating materials. The laminations are placed on edge and are sandwiched together so that the tendency of the outer laminations 22c and 22e to expand or contract longitudinally will be countered by the reaction on the part of the inner lamination 22d. Using the diverse materials results in the lamination tending to expand the greatest being held against such expansion to some degree by the layers having a lower coefficient of expansion. Using outer laminations of proper coefficients of expansion results in a composite rail that will maintain a desired shape and that will not bend out of the desired shape, as would likely occur if only two laminations of materials having different coefficients of expansion were used. Typically, for a straight rail the laminations 22c and 22e would be constructed of steel and the lamination 22d would be of brass. With such a construction, the brass lamination 22d tends to expand the most and, if only one steel lamination were used the resultant rail would curve, on expansion, towards the steel side. With two such outer steel laminations, no such curvature can occur and the expansion of the central lamination is reduced. Naturally, more or fewer laminations may be used, depending upon the characteristics of the materials employed. Longitudinal expansion can be further compensated by constructing lengths of track such that staggered gaps are provided between the end connected laminations, thereby insuring at least two continuous laminations at each point where there is a gap, or by constructing the lengths of track with end to end sections of compensating materials.

Each main vehicle and each shuttle vehicle is self-contained, with its own conventional power source and conventional communication and control systems, and the vehicles can be coupled to provide any desired passenger capacity. Provisions are made for the control system of following vehicles to be overridden by the computerized control center of the leading main vehicle in a train when the distance between vehicles reaches a predetermined interval, so that the control center for the main vehicle serves as the control center for the train, even before the vehicles are actually coupled together. It is thus possible to adjust the speeds of the vehicles to insure safe coupling and uncoupling as will be hereinafter more fully disclosed. While a single main unit vehicle is here described and illustrated, it should be apparent that if the passenger load is sufficient to warrant, more than one such unit can be coupled together to operate in unison as a main vehicle.

Either the auxiliary vehicles 21, which are used to transport passengers to and from intermediate stations S (described further hereafter) to the main vehicle, or the main vehicle itself, will be equipped with sensing equipment which may include collapsible probes and electrical circuits actuated thereby to meter the last short distance between the vehicles as they are coupled using conventional coupling equipment. The signal generated by the circuit of the probe will be fed into the control center of the main vehicle and is used in adjusting the speed of the auxiliary vehicle to insure smooth coupling.

Because of the rapid speeds at which the train travels, conventional railroad track switching systems would be unsafe, even if they could be used with the elevated tracks shown. Thus, a switching system involving transfer rails and extra wheels on the vehicles is used. As best seen in FIGS. 1 and 4, the pair of transfer rails 30 are of the same gauge as the main rails 22a and 22b and are of the same laminated construction. The take off ends 30a of the transfer rails are spaced above the principal main rails 22a and 22b so that the wheels 23 of a main or shuttle vehicle running on the rails 22a and 22b can readily pass under the take off ends. However, if switching is desired, it is accomplished by expelling sets of switching wheels 33 from their position close against the side of the vehicle to an extended position wherein they will engage and run on the switching rails (FIGS. 4 and 5). As the wheels 33 travel further onto the upwardly inclined transfer rails, the wheels 23 lift off rails 22a and 22b and the train is guided upwardly away from the principal main tracks 22a and 22b. The transfer from principal main tracks to transfer tracks is thus made without the necessity for breaks in the rail surface. After the vehicle is clear of the principal main tracks the transfer rails can, if desired, curve laterally away from the main tracks. The wheels 23 can again more onto another set of main rails 22' and the switching wheels, after being disengaged from the switching rails, can be retracted. Since there is no switching of tracks, as with conventional tracks systems there is no danger of accidents due to incomplete or faulty switching. As shown, the switching wheels are journalled on the ends of axle shafts 35, the other ends of which have a piston 36 thereon. The pistons 36 are in a cylinder 37 and actuation of valves 38 by the vehicle operator will move fluid into the cylinder 37 to expel the axle shafts and wheels 33. Operation of valves 39 will retract the pistons while expelling the fluid that expelled them. As shown, the wheels 33 are not powered and the momentum of the vehicle is relied upon to move them from the principal main tracks, along the transfer rails, and onto the next set of main rails where powered wheels 23 will again be operated to power the train.

The vehicles are all constructed in the same manner, using structural techniques presently employed by the aircraft industry in the construction of high speed aircraft. Thus, the lightweight high strength skin 24 is stretched tautly over an interior framework and the interior framework is then decoratively covered on the inside to provide an attractive passenger area. This structure and the techniques thereof are well known and therefore, they are not shown in detail herein. Space is provided in the passenger compartment to accommodate passenger seating along two aisles. As best shown in FIG. 3, a bank of four adjacent seats 40 are preferably provided in the center of the compartment, with an aisle on each side of this center bank of seats and two more aligned seats 41 at the opposite side of each aisle. Thus eight passengers are accommodated in each row of seats. As best seen in FIG. 3, above, the center row of seats, extending longitudinally of the passenger compartment, and secured to the top of the vehicle, there are rows of lockers 42, FIG. 3. Thus, when a passenger boards the vehicle his carry on baggage is placed in the locker corresponding to his seat number and is stored out of the way. Although not shown, closets can be provided at the ends of each row of seats, in the same manner as they are provided in commercial passenger aircraft to secure hanging garments.

An endless conveyor means 43 is spaced at the bottom of and just outwardly of the lockers so that food can be moved thereon from a central kitchen area within the vehicle (not shown) to the vicinity of each seat.

Beneath the floor 45 on which the seats are mounted there is provided a baggage storage compartment 46 for storage of larger items of baggage and the like and for storage of some items of freight. Referring particularly to FIG. 8, it can be seen that spaced support brackets 50 are attached to the roof of the storage area 46. A large sprocket 52 is rotatably supported by each bracket 50 and an endless conveyor chain 53 is trained about the sprockets 52. Hooks 54 are attached to spaced ones of the chain links and the working run of the conveyor chain is guided and supported on a beam 55, the ends of which are secured by bolts or other suitable anchoring means, not shown, to the vehicle interior frame. As a passenger with baggage walks up the stairway 60 of either the auxiliary or shuttle vehicles, FIG. 1, he hands his baggage to a baggage attendant who places it in a compartmented capsule 61 hung by the hooks 54 on the endless conveyor chain 53. The baggage is labled according to its destination. When the shuttle vehicle connects with the main vehicle the attendant in the shuttle vehicle transfers the capsules containing baggage to the main vehicle. The capsule containing the baggage is returned to a shuttle vehicle when the passenger boards it preparatory to leaving the train and the baggage is unloaded therefrom and from the shuttle vehicle when the passenger has arrived at his discharge station.

Referring now to FIG. 11, in operation a two unit main vehicle forms a train that travels very fast, i.e. at speeds in excess of 300 miles per hour, for example, non-stop, as it leaves a terminal station A, heading for a terminal station B. At station A, passengers bound for station B or any intermediate station therebetween, are allowed to board. Intermediate loading and unloading stations S are located at spaced intervals between the stations A and B. As the train approaches the first intermediate station, passengers planning to leave the train at that intermediate station move onto the shuttle vehicle and, as has been noted, their baggage is also transferred to a shuttle vehicle. Before the train reaches the transfer tracks leading into the intermediate station the shuttle vehicle slows slightly and disengages from the main vehicle, its transfer wheels 33 are extended and it engages and travels on the transfer tracks 30. The transfer tracks angle upwardly from the main tracks at 30b and the shuttle car coasts on the transfer tracks until it is entirely clear of the main tracks it left. The wheels 23 then engage and run on a new main track 22' leading into and out of the intermediate station. At the same time, another shuttle vehicle 21 which has been loaded at the intermediate station is moving out on main tracks 22' leading from the intermediate station. From there, it moves onto transfer tracks 30 before moving onto the main tracks 22 on which the main vehicle is traveling. This shuttle vehicle will move onto the main line behind the main vehicle and then will accelerate to a speed such that it can catch up and couple.

Once the shuttle vehicle 21 has coupled to the main vehicle 20 the passengers therein, unless they are planning to get off at the next intermediate station, will move into the main vehicle and their baggage will be moved with them. Those passengers planning to leave the train at the next intermediate station will then move back into the shuttle vehicle, their baggage will be transferred and the process will be repeated. A similar process takes place for the entire run of the train, with the main vehicle stopping only at the terminal stations.

Each vehicle is independently powered by conventional power sources and may have center wheels 65 located at the top of each vehicle and adapted to travel within channeled guideways 66, supported by the arches 27 on which the tracks are mounted. The guideways and center wheels hold the train on the track and prevent excessive lateral sway as it travels at high rates of speed.

Each vehicle is in radio communication with each other vehicle and with the various stations. Each vehicle has an operator to control its operation, but the operation can also be by radio control and, as has been previously noted, the manual operation can be overridden during coupling and disconnect operations by signals provided from a central controller in the main vehicle.

The arches 27 can be of identical construction and only the footings 28 for the arches must be designed to provide the proper elevation at which the arches are mounted. Thus it is a relatively simple matter to obtain safe curves and gradients for the rapid travel, and the cost of installing the tracks is kept to a minimum.

To insure passenger safety, a drone vehicle, completely remotely operated may be travelled on the tracks ahead of the main vehicle. Thus any equipment failures will be detected by the drone vehicle (not shown) and will be telemetered to the main vehicle in time to allow it to be safely stopped.

Although a preferred embodiment of my invention has been herein described, it is to be understood that the present disclosure is made by way of example and that variations are possible without departing from the scope of the hereinafter claimed subject matter, which subject matter I regard as my invention.

I claim:

1. A composite railway track that is longitudinally and horizontally thermally compensating comprising
   at least three elongate laminations sandwiched together to form a single continuous elongate rail, the outer said laminations each being formed from materials having a coefficient of thermal expansion differing from the coefficient of thermal expansion of the material of each inner lamination such that during expansion and contraction of the composite track, the expansion and contractions of the outer laminations maintain the originally set configuration of the composite track; and
   spacing lengths of said laminations in end-to-end relationship to form the continuous elongate rail such that staggered gaps are formed between the end-to-end connections of the said laminations and such that at least two laminations are adjacent the space between any end-to-end spaced laminations.

2. A composite railway track as in claim 1, wherein the track comprises
   a pair of outer laminations of the same first material and having the same coefficient of expansion; and
   an inner lamination of a second material having a different coefficient of expansion than the outer laminations.

3. A composite track as in claim 2, wherein
   the inner lamination is made up of a series of lengths of first and second materials; and
   the outer laminations are made up of a series of lengths of the first and second materials, with the sections of the outer laminations adjacent each length of the inner lamination being made of the material other than that from which the section of inner track is made.

4. A composite track as in claim 2 having a solid, circular cross sectional configuration.

* * * * *